US009734707B2

(12) United States Patent
Jubilo et al.

(10) Patent No.: US 9,734,707 B2
(45) Date of Patent: Aug. 15, 2017

(54) FEATURES FOR USE WITH A MULTI-SIDED CONTROLLING DEVICE

(71) Applicant: Universal Electronics Inc., Santa Ana, CA (US)

(72) Inventors: Joven Jubilo, Anaheim, CA (US); Cesar Alvarado, Brea, CA (US); Linh Do, Westminster, CA (US); Rex Xu, Tustin, CA (US)

(73) Assignee: Universal Electronics Inc., Santa Ana, CA (US)

( * ) Notice: Subject to any disclaimer, the term of this patent is extended or adjusted under 35 U.S.C. 154(b) by 618 days.

(21) Appl. No.: 13/679,131

(22) Filed: Nov. 16, 2012

(65) Prior Publication Data

US 2013/0177318 A1 Jul. 11, 2013

Related U.S. Application Data

(60) Provisional application No. 61/584,488, filed on Jan. 9, 2012.

(51) Int. Cl.
*G05B 11/01* (2006.01)
*G08C 23/04* (2006.01)

(52) U.S. Cl.
CPC .................................... *G08C 23/04* (2013.01)

(58) Field of Classification Search
CPC ...................................................... G08C 23/04
USPC ............ 340/4.3, 12.23, 176, 825.69, 825.72; 345/156, 158, 168
See application file for complete search history.

(56) References Cited

U.S. PATENT DOCUMENTS

| | | | | |
|---|---|---|---|---|
| 6,587,094 | B2 * | 7/2003 | Anderson | 345/168 |
| 6,753,789 | B1 * | 6/2004 | Batra et al. | 340/12.5 |
| 6,853,308 | B1 | 2/2005 | Dustin | |
| 7,123,242 | B1 | 10/2006 | Henty | |
| 7,500,202 | B2 | 3/2009 | Gerba et al. | |
| 2002/0141732 | A1 * | 10/2002 | Reese et al. | 386/46 |
| 2006/0017857 | A1 * | 1/2006 | Sata et al. | 348/734 |
| 2006/0290668 | A1 | 12/2006 | Sloo et al. | |
| 2009/0096657 | A1 * | 4/2009 | Lin et al. | 341/176 |
| 2009/0284472 | A1 * | 11/2009 | Mehta et al. | 345/169 |
| 2009/0322552 | A1 * | 12/2009 | Machimura et al. | 340/825.72 |
| 2010/0060604 | A1 * | 3/2010 | Zwart et al. | 345/173 |
| 2010/0149017 | A1 * | 6/2010 | Besshi et al. | 341/176 |
| 2010/0164745 | A1 | 7/2010 | Migos et al. | |
| 2011/0128228 | A1 * | 6/2011 | Van der Byl | 345/167 |
| 2011/0235281 | A1 * | 9/2011 | Mittleman | 361/728 |
| 2011/0279223 | A1 * | 11/2011 | Hatambeiki et al. | 340/4.3 |

OTHER PUBLICATIONS

ISA/US, International Search Report and Written Opinion of PCT Appln. No. US13/020657, mailed on Mar. 11, 2013, 9 pages.
European Patent Office, Supplementary European Search Report issued on European patent application No. 13736336.2, dated May 6, 2015, 6 pages.

* cited by examiner

*Primary Examiner* — Hai Phan
*Assistant Examiner* — Royit Yu
(74) *Attorney, Agent, or Firm* — Greenberg Traurig, LLP

(57) ABSTRACT

A multi-sided controlling device automatically makes keys on one or more sides of the controlling device active as a function of an operating mode of the controlling device. One or more sides of such a multi-sided controlling device may also have at least one keycap behind which is positioned an IR transmitter usable when another side of the controlling device is active.

3 Claims, 5 Drawing Sheets

FEATURES FOR USE WITH A MULTI-SIDED CONTROLLING DEVICE

RELATED APPLICATION INFORMATION

This application claims the benefit of U.S. Provisional Application No. 61/584,488, filed on Jan. 9, 2012, the disclosure of which is incorporated herein by reference in its entirety.

BACKGROUND

Controlling devices, for example remote controls, for use in issuing commands to entertainment and other appliances, and the features and functionality provided by such controlling devices are well known in the art and have become ubiquitous in the home. Increasingly in today's environment, such controlling devices are used to interact with displayed menu systems, browse web pages, etc., and perform other similar activities which may require entry of text data such as URLs, search terms, messages, etc. In such instances entry of text data may be facilitated by the provision of qwerty keypad functionality as part of a controlling device. Further, as a result of the increasing complexity of modern appliance feature sets, in other instances it has become desirable to offer the user of such an appliance both a simplified controlling device keypad supporting commonly-used appliance functions and a secondary keypad supporting less frequently used appliance functionalities, or alternatively to distribute the increasingly large number of available functions across multiple keypads in order to reduce visual clutter. Accordingly, controlling devices which support various combinations of keypad input mechanisms across multiple surfaces are becoming increasingly common.

SUMMARY

This invention relates generally to controlling devices such as remote controls, and more specifically to controlling devices having multiple, usable sides, i.e., sides which support activatable keys or buttons. In an exemplary embodiment, a three-sided or prism-shaped controlling device is disclosed having a first side which supports a keypad for use in controlling a first set of functional operations of one or more controllable appliances, a second side which supports a keypad for use in controlling a second set of functional operations of one or more controllable appliances, and a third side which supports a conventional qwerty keypad. The keypad of the first and second sides of the controlling device may be intuitively mapped to corresponding operational modes of the controlling device. For example, the first side may support keys for use in controlling commonly used functions of entertainment equipment in a home theater mode of the controlling device while the second side may support keys for use in controlling a specific piece of controllable equipment, such as a television in a television mode of the controlling device. The controlling device may utilize one or more sensors, such as accelerometers, to determine which one of the multiple sides of the controlling device is facing generally upwards or otherwise facing in an predetermined orientation of use (e.g., positioned under a thumb of a right handed or left handed user when held in the respective hand) to thereby render one or more of the multiple sides active, i.e., a mode in which activations of keys of that side will cause the controlling device to perform an action, while rendering the other one or more of the multiple sides inactive, i.e., a mode wherein activations of keys of the remaining sides will not cause the controlling device to perform an action. In further embodiments, the selection of an operational mode of the controlling device may be manually controlled by a user, for example, via activation of one or more switches, instead of being automatically controlled via the use of the sensors. In a further embodiment, infrared light emitting elements may be positioned under one or more keycaps to thereby allow control signals to be effectively emitted from the controlling device in various orientations of the controlling device.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
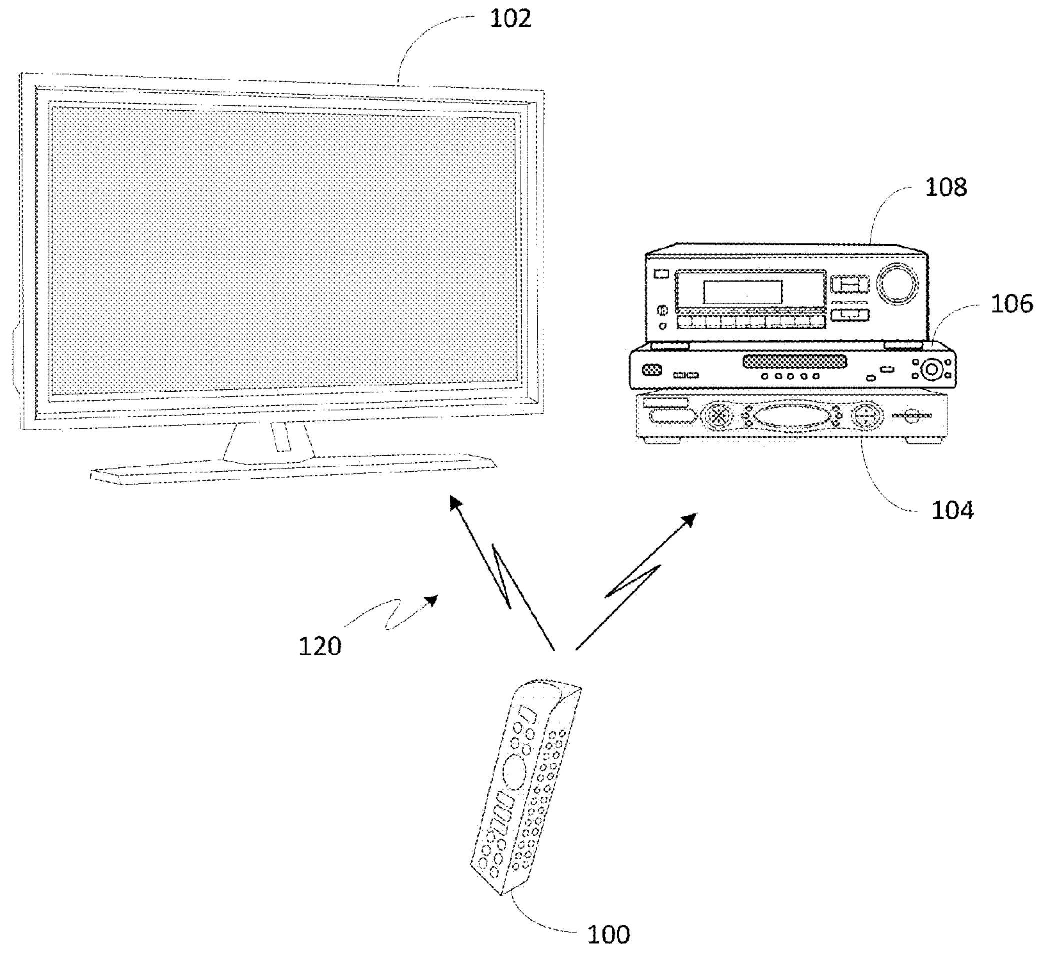
FIG. 1 illustrates an exemplary system in which a controlling device constructed in accordance with the description that follows may be utilized.

With reference to FIG. 1, there is illustrated an exemplary system in which a controlling device 100 is configured to control various controllable appliances, such as a television 102, a set top box ("STB") 104, a DVD player 106, and an AV receiver 108. As is known in the art, the controlling device 100 may be capable of transmitting commands to the appliances, using any convenient IR, RF, Point-to-Point, or networked protocol 120, to cause the appliances to perform operational functions. While illustrated in the context of a television 102, a STB 104, a DVD player 106, and an AV receiver 108 it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
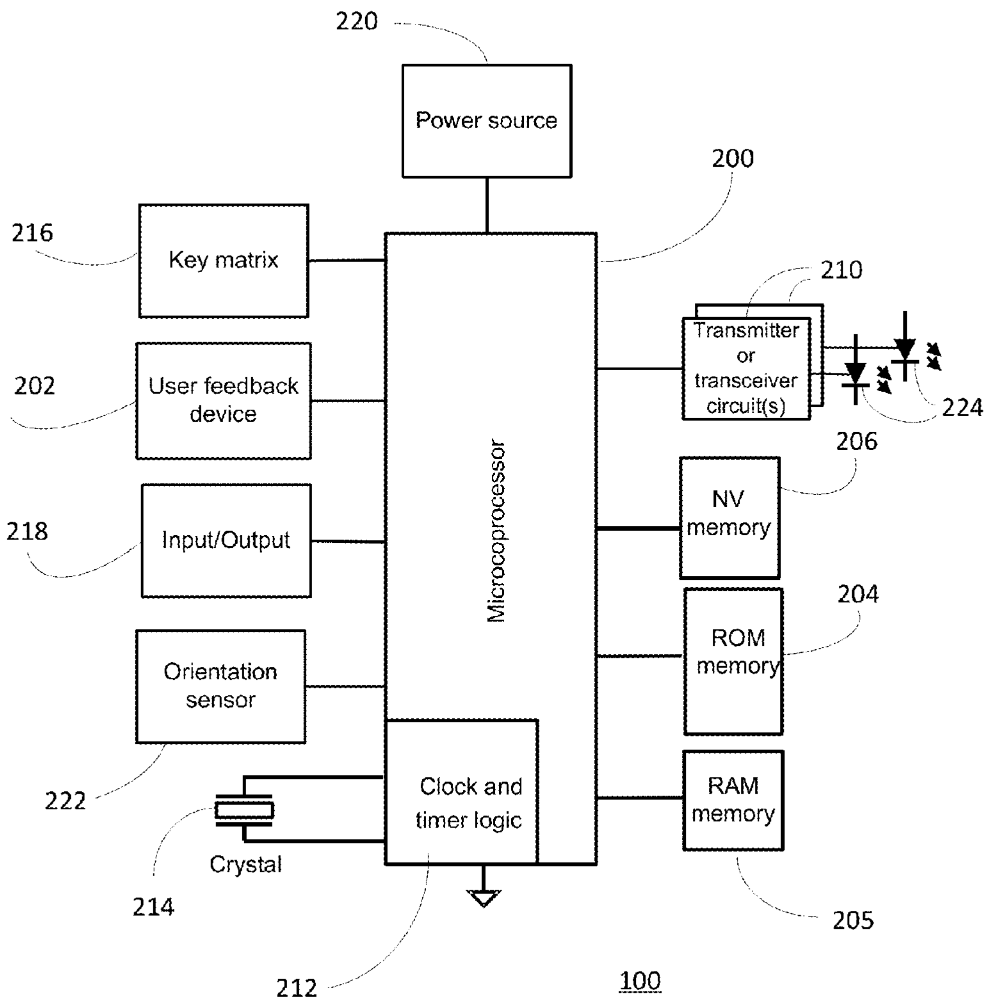
FIG. 2 illustrates in block diagram form components of the exemplary controlling device of FIG. 1.

With reference to FIG. 2, for use in commanding the functional operations of one or more appliances, the controlling device 100 may include, as needed for a particular application, a processor 200 coupled to a ROM memory 204, a non-volatile read/write memory 206, a RAM memory 205, a key matrix 216 (e.g., hard keys, soft keys such as a touch sensitive surface overlaid on a liquid crystal (LCD), or an electroluminescent (EL) display, or any combination thereof, and which in some embodiments may be deployed across multiple surfaces of controlling device 100), one or more transmission circuits and/or transceiver circuits 210 (e.g., IR and/or RF) for use in issuing commands to controlled appliances, a means 202 to provide feedback to the user (e.g., one or more LEDs, illuminable keys, display, speaker, and/or the like), an input/output port 218 such as a serial interface, USB port, modem, etc., a power source 220 such as a battery, and clock and timer logic 212 with associated crystal or resonator 214, and an orientation sensor 222 such as an accelerometer or the like. In those embodiments where command transmissions to controlled appliances may comprise an infrared signal, controlling device transmitter circuits 210 may be provisioned with one or more infrared emitting diodes 224, as known in the art. As will be understood by those skilled in the art, some or all of the memories 204, 205, 206 may include executable instructions (collectively, the controlling device program memory) that are intended to be executed by the processor 200 to control the operation of the controlling device 100, as well as data which serves to define the necessary control protocols and command values for use in transmitting command signals to controllable appliances (collectively, the command data). In this manner, the processor 200 may be programmed to control the various electronic components within the controlling device 100, e.g., to monitor the key matrix 216 and/or orientation sensor 222, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the non-transitory memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 may be adapted to be responsive to events, such as a sensed user interaction with the key matrix 216, a signal from a sensor 222, etc. In response to an event, appropriate instructions within the program memory (hereafter the "controlling device operating program") may be executed. For example, when a command function key is actuated on the controlling device 100, the controlling device 100 may retrieve from the command data stored in memory 204, 205, 206 a command value and control protocol corresponding to the actuated function key and, where necessary, current device mode of controlling device 100 (e.g., TV mode, home theater mode, etc.) and transmit that command to an intended target appliance, e.g., STB 106, in a format recognizable by that appliance to thereby control one or more functional operations of that appliance. It will be appreciated that the controlling device operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. Additionally, in the instant invention the controlling device operating program of exemplary controlling device 100 may be operative to monitor orientation sensor 222 in order to enable and/or disable subsets of key matrix 216 which are appropriate to the current orientation of controlling device 100.

In some embodiments, controlling device 100 may be of the universal type, that is provisioned with a library comprising a multiplicity of command codes and protocols, i.e., command data, suitable for controlling various appliances. In such cases, for selecting sets of command data to be associated with the specific appliances to be controlled (hereafter referred to as a setup procedure), data may be entered into the controlling device 100 that serves to identify each intended target appliance by its make, and/or model, and/or type. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data set may take the form of a numeric setup code entered via activation of those keys that are also used to cause the transmission of commands to an appliance (obtained, for example, from a printed list of manufacturer names and/or models with corresponding code numbers, from a support Web site, etc.). Alternative setup procedures known or proposed in the art include scanning bar codes, sequentially transmitting a predetermined command in different formats until a target appliance response is detected, user interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938, all of like assignee and incorporated herein by reference in their entirety.

Figure 3:
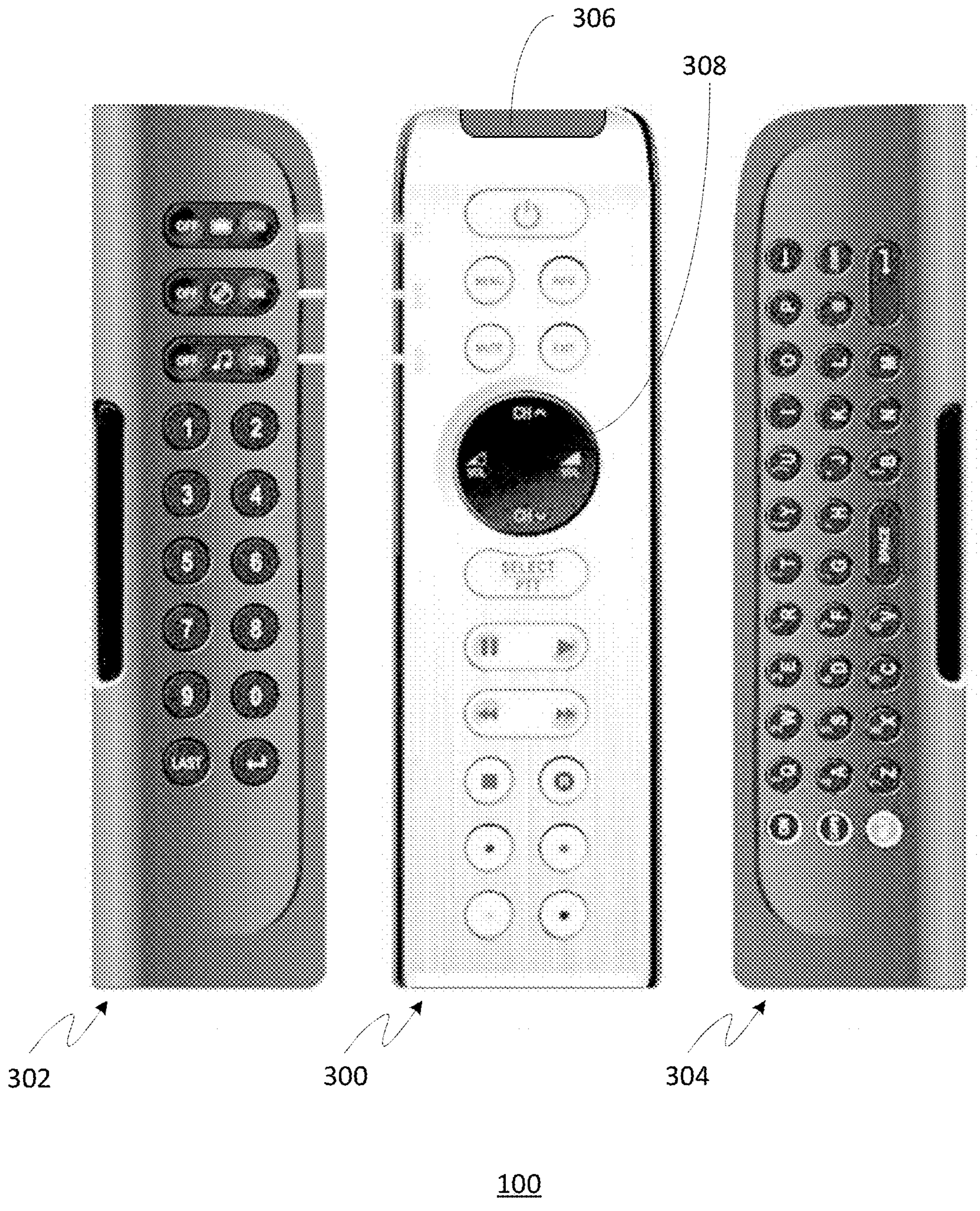
FIG. 3 illustrate an exemplary controlling device having three sides supporting keypads.

As further illustrated in FIG. 3, the key matrix of the exemplary controlling device 100 may be distributed over multiple sides of the controlling device, for example a first side 300, a second side 302, and a third side 304. More particularly, the first side 300 may include a first set of keys or buttons for use in controlling one or more controllable functions of one or more controllable devices associated with a first operating mode of the controlling device, e.g., a home theater control mode. The second side 302 may include a second set of keys or buttons for use in controlling one or more controllable functions of one or more controllable devices associated with a second operating mode of the controlling device, e.g., a television and/or a set top box control mode. The third side 304 may include a third set of keys or buttons for use in controlling one or more controllable functions of one or more controllable devices associated with a third operating mode of the controlling device, e.g., a text entry mode. As will be understood, the controlling device 100 will be caused to transmit commands and/or data in response to activations of one or more keys that correspond to a mode that is currently active in the controlling device 100. The keys are further appropriately labeled for each of the various modes as illustrated in FIG. 3.

The controlling device operating program of controlling device 100 may utilize inputs from one or more orientation sensors, e.g., accelerometers, proximity sensors, etc., to automatically transition between each of the various operating modes. For example, orientation sensor 222 may function to indicate which of the three sides 300, 302, or 304 is oriented in an operating position and thereby cause the controlling device operating program to configure the controlling device to transmit commands and/or data in response to activations of the keys of such active mode. The operating position may be, without limitation, a one of the sides being oriented as the upward facing side, a one of the sides being angled into a position that would have the side positioned under the thumb of a right handed or left handed user, etc. While the orientation sensor would function to make active the keys corresponding to the active side or sides of the controlling device, i.e., those keys that that are used to support the discerned, current operating mode of the controlling device, the controlling device operating program would also preferably render some or all of the keys positioned on the side or sides corresponding to the discerned, inactive modes of the controlling device inactive to thereby prevent inadvertent operation of such keys. For example, a key on an inactive side of the controlling device 100 that might be positioned under a thumb of a user holding the controlling device 100 may be allowed to remain active to thereby allow that key to be used as a trigger switch, a shift key, or the like as desired. One or more switches may also be provided to allow the user to manually switch between the various supported modes of the controlling device 100. For further information regarding multi-sided remote controls used to transmit both commands and data, reference may be had to co-pending U.S. patent application Ser. No. 12/849,497, of common ownership and incorporated herein by reference in its entirety.

Figure 4:
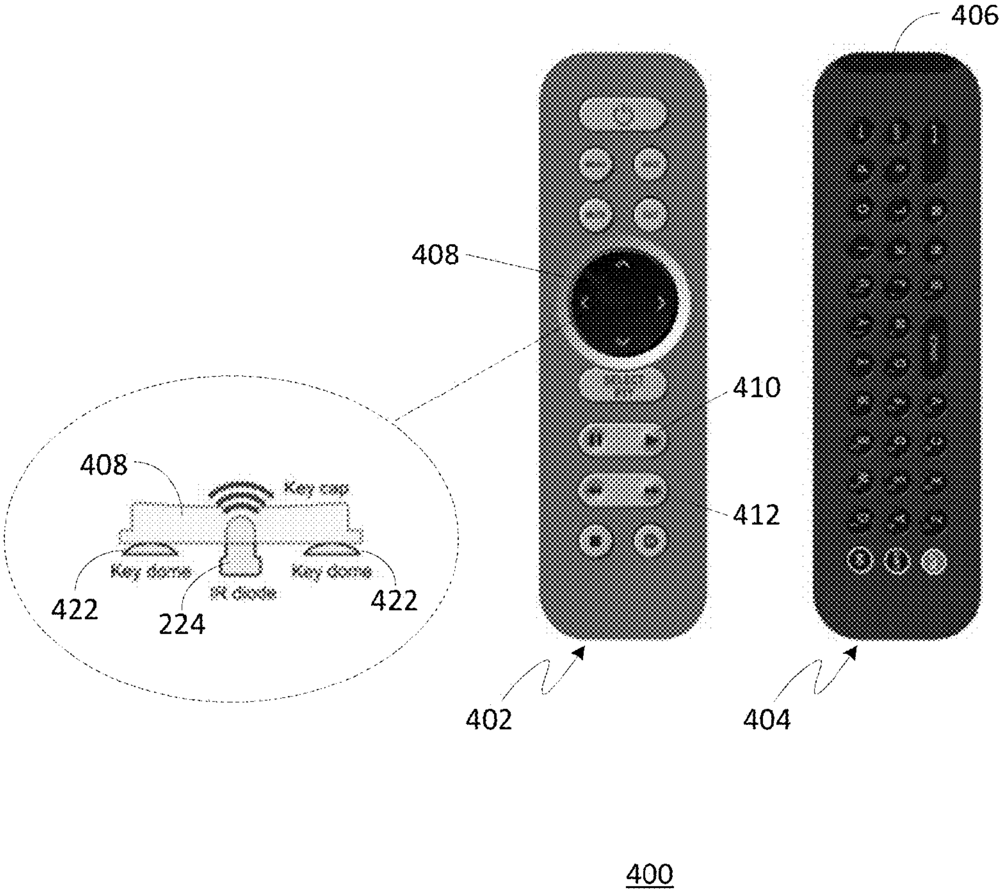
FIG. 4 illustrates an exemplary keycap and IR emitter combination.

Turning now to FIG. 4, with the increase of functionality required on controlling devices 100, e.g., to provide command control as well as qwerty text entry, designs of controlling devices are evolving into form factors that allow use of the device in multiple orientations. One example of such a configuration is a double sided design 400 with a front side 402 of the controlling device being used for regular remote functions when used in a first orientation of the controlling device and a back side 404 of the controlling device being used for a qwerty key board when used in a second orientation of the controlling device. Another such configuration may be three sided design 100 such as illustrated in FIG. 3 and described above. In either instance, in order to send IR commands and/or data when the controlling device is in a given orientation, additional IR diodes may be provided on one or more of the sides of the unit in addition to those normally provided at the top end 406 of the controlling device 400 or the top end 306 of controlling device 100 (e.g., the end that is often pointed at the target controllable appliances).

More particularly, one or more sides of controlling devices 100 or 400 may be provided with special keycap arrangements that support one or more IR transmitters that may be available for use when another side of the controlling device is active. For example, in double sided controlling device 400 remote with a qwerty keyboard on the back side 404, the navigation key cap 408, or the volume or channel rocker key caps 410 and 412, or the like on the front side 402 of controlling device 400 may be used as an IR lens when the qwerty keyboard side of the controlling device 400 is in use, i.e., the rear side 406 is the active side. In the alternative three sided design 100, the navigation key cap 308 on side 300 may be used as the IR lens.

In either instance, the mechanical design may comprise a key cap 408 that is made of a material which is translucent to infrared light, for example a dark polycarbonate material or the like. Key cap 408 may be arranged to allow the key cap to tilt in two or more directions as needed to thereby allow for the key caps to be actuated in an otherwise conventional manner, such as up/down/left/right, CH+/− or volume up/down, etc. For example, as illustrated, the periphery of key cap 408 may rest on one or more dome switches 422 which form part of key matrix 216. Preferably, one or more IR diodes, for example IR diode 224, may be disposed intermediate the dome switches 422, e.g., behind the center of key cap 408, and used to transmit IR command and/or data when the appropriate keys on another, active side of the controlling device are activated. The result is a discrete design that allows the controlling device operating program to cause the transmission of IR command and data signals from hidden IR diodes located in different parts of the device depending on the orientation or keys in use. In this manner, IR transmission and coverage may be optimized and energy usage may be reduced, for example only one of IR diodes 224 may be in use at any given time. As will be appreciated, further detailed design of the key cap and/or light pipes may also improve IR performance and IR angle to accommodate different hand grips in various usage orientations.

Figure 5:
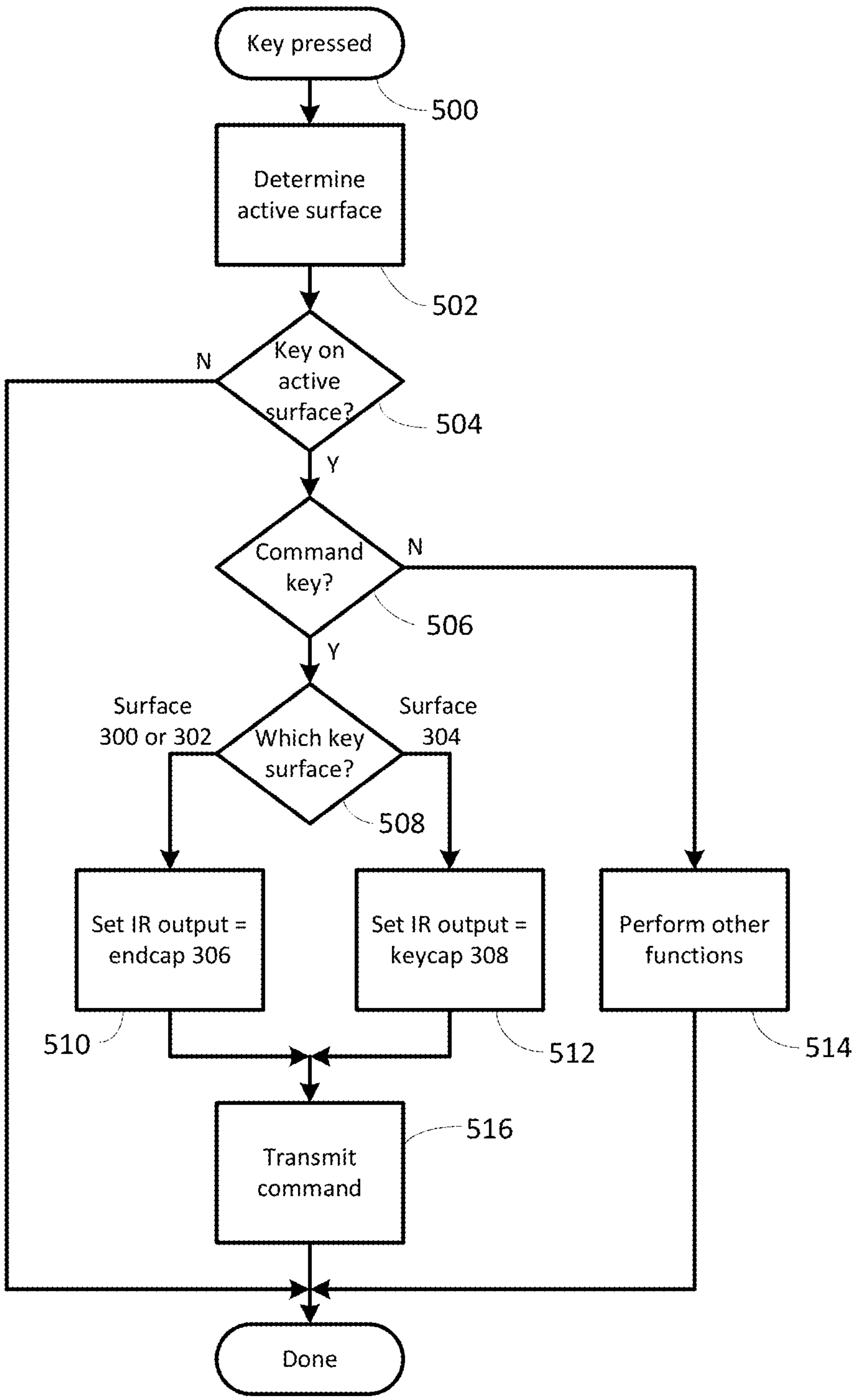
FIG. 5 illustrates a series of steps which may be performed by the programming of the exemplary controlling device of FIGS. 1, 2, and 3.

Turning now to FIG. 5, the steps performed by an exemplary operating program of controlling device 100 in response to detection of a key press 500 may comprise: At step 502 it may first be determined which surface (e.g., 300, 302, or 304) of controlling device 100 is currently active. Such determination may be based on input from an orientation sensor 223, a user switch setting, a target appliance state (as further described for example in above referenced U.S. patent application Ser. No. 12/849,497), or any other convenient method as appropriate for a particular embodiment. Next, at step 504 it may be determined if the detected key is a member of the currently active surface. If not, the key press may be ignored and processing is complete. If the detected key is however a member of the active surface, at step 506 it may then be determined if the key is a command key, i.e. is intended to cause transmission of an operational command to one of appliances 102 through 108. If not, at step 514 local operations, e.g. set up, macro programming, etc., as described previously, may be performed by the controlling device operating program as appropriate to the particular key.

If the detected key does correspond to a command function, at steps 508 through 512 an IR output path may be set which is suitable for the currently active surface. For example, if either of surfaces 300 or 302 are active, at step 510 the IR transmitter positioned behind endcap 306 may be selected as the output path, while if surface 304 (the qwerty keypad) is active, at step 512 the IR transmitter positioned behind keycap 308 may be selected as the output path. Thereafter, at step 516 the requested operational command may be transmitted to the target appliance using the designated IR output path, and processing is complete.

In some embodiments of a three-sided, prism-like controlling device design—which design allows a device such as controlling device 100 to be placed into a free-standing position, e.g., upright on its end—one or more IR transmitters on one or more sides 300, 302, and 304 of controlling device 100, e.g., the IR transmitter under keycap 308, may be further utilized to facilitate IR transmissions when the controlling device is used as a relay or bridge device, such as described in co-pending U.S. patent application Ser. No. 13/071,661, of common ownership and incorporated herein by reference in its entirety. In such embodiments, input from the orientation sensor may also be utilized by the controlling device operating program to automatically place the controlling device into such a relay or bridge mode when the controlling device is sensed as being placed into such an upright, free-standing position.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A multi-sided controlling device, comprising:

a housing having a first side and a second side, wherein the first side has a first set of activable key elements and the second side has a second set of activable key elements;

a first IR transmitter and a second IR transmitter; and a processing device having associated programming which uses a received signal to select a single one of the first IR transmitter and the second IR transmitter and which causes the selected single one of the first IR transmitter and the second IR transmitter to generate an IR transmission signal corresponding to an activated one or more of the first set of activable key elements of the first side of the housing or an activated one or more the second set of activable key elements of the second side of the housing.

2. The multi-side controlling device as recited in claim 1, wherein the multi-sided controlling device further comprises an orientation sensor and wherein the orientation sensor generates the received signal that is used by the processing device to select the single one of the first IR transmitter and the second IR transmitter.

3. The multi-sided controlling device as recited in claim 2, wherein the first IR transmitter is supported in a key cap of a one of the first set of activable key elements of the first side of the housing and wherein the second IR transmitter is located at an end of the housing.

* * * * *